(12) United States Patent
Aoki et al.

(10) Patent No.: US 11,492,995 B2
(45) Date of Patent: Nov. 8, 2022

(54) INTERNAL COMBUSTION ENGINE AND METHOD OF MANUFACTURING THE SAME

(71) Applicant: Mazda Motor Corporation, Hiroshima (JP)

(72) Inventors: Osamu Aoki, Aki-gun (JP); Kenji Uchida, Aki-gun (JP); Yoshihisa Nakamoto, Aki-gun (JP); Keisuke Okihama, Aki-gun (JP); Akira Kuramochi, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 105 days.

(21) Appl. No.: 17/103,804

(22) Filed: Nov. 24, 2020

(65) Prior Publication Data

US 2021/0180538 A1  Jun. 17, 2021

(30) Foreign Application Priority Data

Dec. 17, 2019  (JP) .............................. JP2019-227301

(51) Int. Cl.
*F02F 1/00*  (2006.01)
*F02F 3/14*  (2006.01)
(Continued)

(52) U.S. Cl.
CPC ................ *F02F 1/004* (2013.01); *B05D 1/02* (2013.01); *B05D 3/0254* (2013.01);
(Continued)

(58) Field of Classification Search
CPC .......... F02F 1/004; F02F 3/14; F02F 2200/00; F02D 41/401; F02D 2041/389; F02D 41/04; B05D 1/02; B05D 3/0254
See application file for complete search history.

(56) References Cited

U.S. PATENT DOCUMENTS

2004/0265214 A1* 12/2004 Anderson .............. B82Y 30/00
                                                          423/579
2012/0067026 A1*  3/2012 Gonze ..................... F01N 13/02
                                                          60/277
(Continued)

FOREIGN PATENT DOCUMENTS

JP  2013185202 A  *  9/2013
JP  2014001718 A  *  1/2014
(Continued)

*Primary Examiner* — Kurt Philip Liethen
(74) *Attorney, Agent, or Firm* — Alleman Hall Creasman & Tuttle LLP

(57) ABSTRACT

A method of manufacturing an internal combustion engine is provided. The engine includes a cylinder forming member, a piston reciprocatably accommodated in a cylinder, an injector which supplies fuel into a combustion chamber, and a heat insulating layer covering at least a part of a combustion-chamber wall surface and having a lower heat conductivity than the combustion-chamber wall surface. The method includes applying a coating material that is a material of the heat insulating layer to the combustion-chamber wall surface, assembling the piston to the cylinder forming member while the coating material is uncured, and heating the coating material to be cured by combusting the fuel injected from the injector and reciprocating the piston. The heating the coating material includes injecting the fuel from the injector at least in an early stage of the heating so that the injected fuel adhering to the surface of the coating material is suppressed.

16 Claims, 6 Drawing Sheets

(51) Int. Cl.
*F02D 41/40* (2006.01)
*B05D 1/02* (2006.01)
*B05D 3/02* (2006.01)
*F02D 41/38* (2006.01)

(52) U.S. Cl.
CPC .............. *F02D 41/401* (2013.01); *F02F 3/14* (2013.01); *F02D 2041/389* (2013.01); *F02F 2200/00* (2013.01)

(56) References Cited

U.S. PATENT DOCUMENTS

2017/0121839 A1* 5/2017 Yamashita ............ F02F 3/0084
2019/0390591 A1* 12/2019 Sukegawa ................ F02F 3/12
2021/0332750 A1* 10/2021 Nou ........................ F02B 77/11

FOREIGN PATENT DOCUMENTS

| | | | | |
|---|---|---|---|---|
| JP | 2014001718 A | | 1/2014 | |
| JP | 2018184909 A | * | 11/2018 | |
| WO | WO-2014024494 A1 | * | 2/2014 | ................ F01L 3/04 |

* cited by examiner

INTERNAL COMBUSTION ENGINE AND METHOD OF MANUFACTURING THE SAME

TECHNICAL FIELD

The present disclosure relates to an internal combustion engine which includes a cylinder forming member which forms a cylinder therein, a piston reciprocatably accommodated in the cylinder, an injector which supplies fuel into a combustion chamber defined by the cylinder and the piston, and a heat insulating layer which covers at least a part of a combustion-chamber wall surface defining the combustion chamber and of which a heat conductivity is lower than the combustion-chamber wall surface, and a method of manufacturing the same.

BACKGROUND OF THE DISCLOSURE

For the purpose of improving thermal efficiency of an internal combustion engine, covering a wall surface of a combustion chamber by a heat insulating layer is proposed. For example, JP2014-001718A discloses an internal combustion engine in which, on a surface of a base material defining a combustion chamber, a heat insulating layer of which the heat conductivity is lower than the base material is formed.

In detail, JP2014-001718A proposes, as a method of forming the heat insulating layer, applying a coating material (a mixture of Si-based resin, hollow particles, diluting solvent, etc.) which is the material of the heat insulating layer on the surface of the base material, assembling the engine in that state, and performing a combustion test (ignition test). By performing the combustion test in the engine to which the coating material is applied, the surface of the coating material is oxidized (cured) by combustion heat, thereby forming the heat insulating layer.

According to the method of forming the heat insulating layer disclosed in JP2014-001718A, since a part of the process for forming the heat insulating layer can be substituted by the combustion test which is normally performed after the engine is assembled, there is an advantage, such as reducing the burden in forming the heat insulating layer.

However, according to the present inventors' research, when the heat insulating layer is formed by the method of heating the coating material by the combustion heat of a mixture gas like in JP2014-001718A, the quality of the heat insulating layer is not always stable, and part of the heat insulating layer may peel off. After exploring the cause, the present inventors discovered that a portion of fuel supplied from an injector during the combustion test adheres to the coating material while still in a droplet state, and this mainly leads to the problem. That is, when the fuel in the droplet state adheres to the coating material, the coating material is diluted or dissolved (hereinafter, simply referred to as "diluted") by the adhered fuel, and the viscosity of the coating material decreases at the diluted part (the part to which the fuel is adhered). As a result, the coating material at this part is dispersed by receiving the combustion pressure during the combustion test, and this causes the peeling described above.

SUMMARY OF THE DISCLOSURE

The present disclosure is made in view of the above situations, and one purpose thereof is to provide a method of manufacturing an internal combustion engine, capable of easily forming a heat insulating layer of an outstanding quality with which peeling will not occur.

According to one aspect of the present disclosure, a method of manufacturing an internal combustion engine is provided, the engine including a cylinder forming member forming a cylinder therein, a piston reciprocatably accommodated in the cylinder, an injector configured to supply fuel into a combustion chamber defined by the cylinder and the piston, and a heat insulating layer covering at least a part of a combustion-chamber wall surface defining the combustion chamber and having a lower heat conductivity than the combustion-chamber wall surface. The method includes the steps of applying a coating material that is a material of the heat insulating layer to the combustion-chamber wall surface (an application step), assembling the piston to the cylinder forming member while the coating material is uncured (an assembly step), and heating the coating material to be cured by combusting the fuel injected from the injector and reciprocating the piston (a bake step). The heating the coating material (the bake step) includes injecting the fuel from the injector at least in an early stage of the heating so that the injected fuel adhering to the surface of the coating material is suppressed (a first bake step).

According to this configuration, the coating material applied to the combustion-chamber wall surface is baked (cured) using the combustion heat during the operation carried out after the assembly of the substantial parts including the piston and the cylinder forming member. Thus, for example, by performing the operation for baking (the bake step) as a test operation (combustion test) normally performed in the manufacturing process of engines, the burden and the cost required for baking the coating material (i.e., forming the heat insulating layer) can be reduced.

Moreover, since the fuel is injected at least in the early stage of the bake step so that the injected fuel adhering to the surface of the coating material is suppressed, the possibility of the uncured coating material is diluted by the adhered fuel (particularly, toluene contained in the fuel) is reduced. Therefore, even if a large pressure by the combustion of a mixture gas (combustion pressure) acts on the coating material, a deformation occurring in the coating material can be minimized, and therefore, the quality of the heat insulating layer comprised of the cured coating material can be appropriately secured. For example, if the coating material is diluted by adhesion of the fuel, the viscosity of the coating material decreases in the diluted part (fuel adhered part). Thereby, the coating material may be dispersed when high combustion pressure acts thereon. On the other hand, in this configuration where the fuel is suppressed from adhering to the surface of the coating material, the possibility of the dispersion of the coating material caused by the above situation can be avoided. As a result, the possibility that a defect, such as peeling, occurs in the heat insulating layer can be reduced, thereby securing the appropriate quality of the heat insulating layer.

The application step may include applying the coating material at least to a crown surface of the piston. The first bake step may include setting an injection timing of the fuel from the injector as a period including an intake bottom dead center.

When the coating material is applied to the piston crown surface as described above, the possibility of the injected fuel from the injector reaching the coating material in the droplet state becomes lower as the piston is located closer to a bottom dead center (i.e., as the piston separates from the injector). According to this configuration, since the fuel is injected over the continuous period including the intake bottom dead center, the possibility of the injected fuel reaching (adhering to) the coating material on the piston crown surface in the droplet state can greatly be reduced.

The bake step may further include advancing an injection start timing and an injection end timing of the fuel from the injector (the second bake step) after the first bake step is performed.

When the fuel injection timing is relatively advanced in the second bake step following the first bake step, the fuel can be fully mixed with air to form a uniform mixture gas, and the combustion stability of the mixture gas can be improved.

The bake step may further include advancing an injection start timing and an injection end timing of the fuel from the injector (a second bake step) after the first bake step is performed. The first bake step may include reducing an injection amount of the fuel from the injector below that during the second bake step.

The possibility of the injected fuel from the injector reaching the coating material of the combustion-chamber wall surface in the droplet state becomes lower as the fuel injection amount is lower. According to this configuration, since the fuel injection amount is reduced during the first bake step, the possibility of the injected fuel reaching (adhering to) the coating material in the droplet state can be reduced.

On the contrary, since the fuel injection amount is increased in the following second bake step, the curing (baking) of the inside of the coating material can be stimulated, while securing the above effect of suppressing the defect, such as peeling, thereby reducing the burden required for forming the heat insulating layer. That is, the curing of the coating material progresses quicker on the surface than the inside. On the other hand, if the surface of the coating material is fully hardened (even if the inside has not been hardened), the dilution of the coating material by the adhesion of fuel will not take place. Therefore, the situation where a part of the coating material is dispersed by the combustion pressure is avoidable. According to this configuration, since the injection amount is increased in response to the transition from the first bake step to the second bake step, for example, by shifting to the second bake step at the timing when the surface of the coating material is fully hardened, the increase in the injection amount can improve the combustion heat (heat capacity), while avoiding the above situation where a part of the coating material is dispersed. Therefore, the curing rate inside the uncured coating material can be increased. Thus, the time required for curing the entire coating material can be shortened, and the efficiency of the formation of the heat insulating layer can be increased, while securing the quality of the heat insulating layer.

The application step may include applying the coating material at least to a crown surface of the piston. The first bake step may include setting an injection timing of the fuel from the injector to a timing at which the piston is located closer to a bottom dead center than during the second bake step.

When the fuel injection timing during the first bake step is brought closer to the bottom dead center, the possibility that the fuel adheres to the coating material on the piston crown surface can be reduced, with the help of the fuel injection amount being reduced during the first bake step.

The first bake step may include reducing an injection pressure of the fuel from the injector compared to during the second bake step.

When the fuel injection pressure is reduced during the first bake step, the penetration of fuel can become weaker due to the decrease in the injection pressure, and the possibility of the fuel reaching the coating material can be reduced.

The second bake step may be started when an elapsed time after the first bake step is started reaches a predetermined period of time.

According to this configuration, the transition from the first bake step to the second bake step can be determined with a simple method.

The method may further include determining a degree of curing of the surface of the coating material baked by the first bake step. When the curing of the surface of the coating material is determined to be finished, the second bake step may be started.

If the curing of the surface of the coating material is finished, the dilution of the coating material will not take place even if the fuel is adhered. The necessity of suppressing the adhesion of the fuel to the coating material by the first bake step decreases. According to this configuration, the timing where the curing of the surface of the coating material is finished is determined, and the transition from the first bake step to the second bake step is performed at the determined timing. While securing the effect described above (avoiding the coating material from being dispersed by the combustion pressure), the mode of the fuel injection can be switched suitably. Note that the timing where the curing of the surface of the coating material is finished may be determined by a direct method of detecting the content of diluent contained in exhaust gas or an indirect method of confirming that a given period obtained experimentally in advance is elapsed.

Further, according to another aspect of the present disclosure, an internal combustion engine manufactured by the method described above is provided.

DETAILED DESCRIPTION OF THE DISCLOSURE

Overall Configuration of Engine

Figure 1:
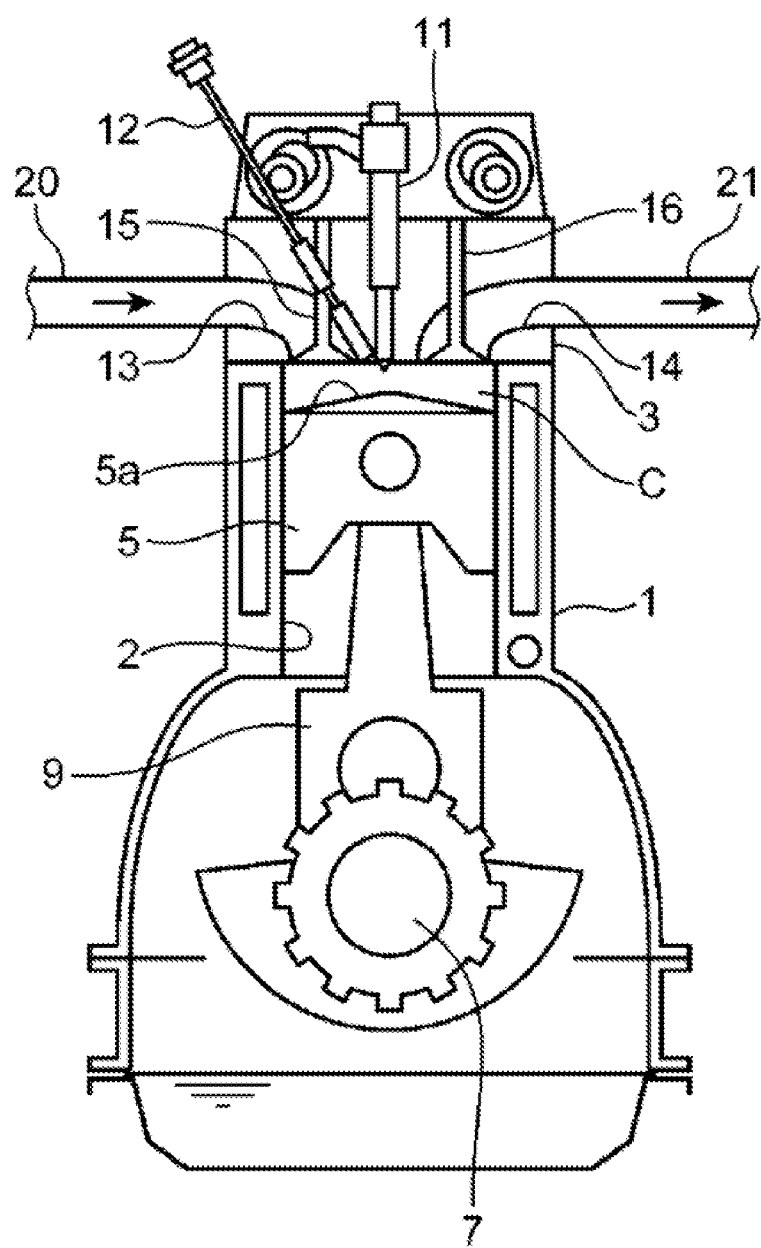
FIG. 1 is a system diagram illustrating an outline configuration of an internal combustion engine manufactured by a manufacturing method according to one embodiment of the present disclosure.
Figure 2:
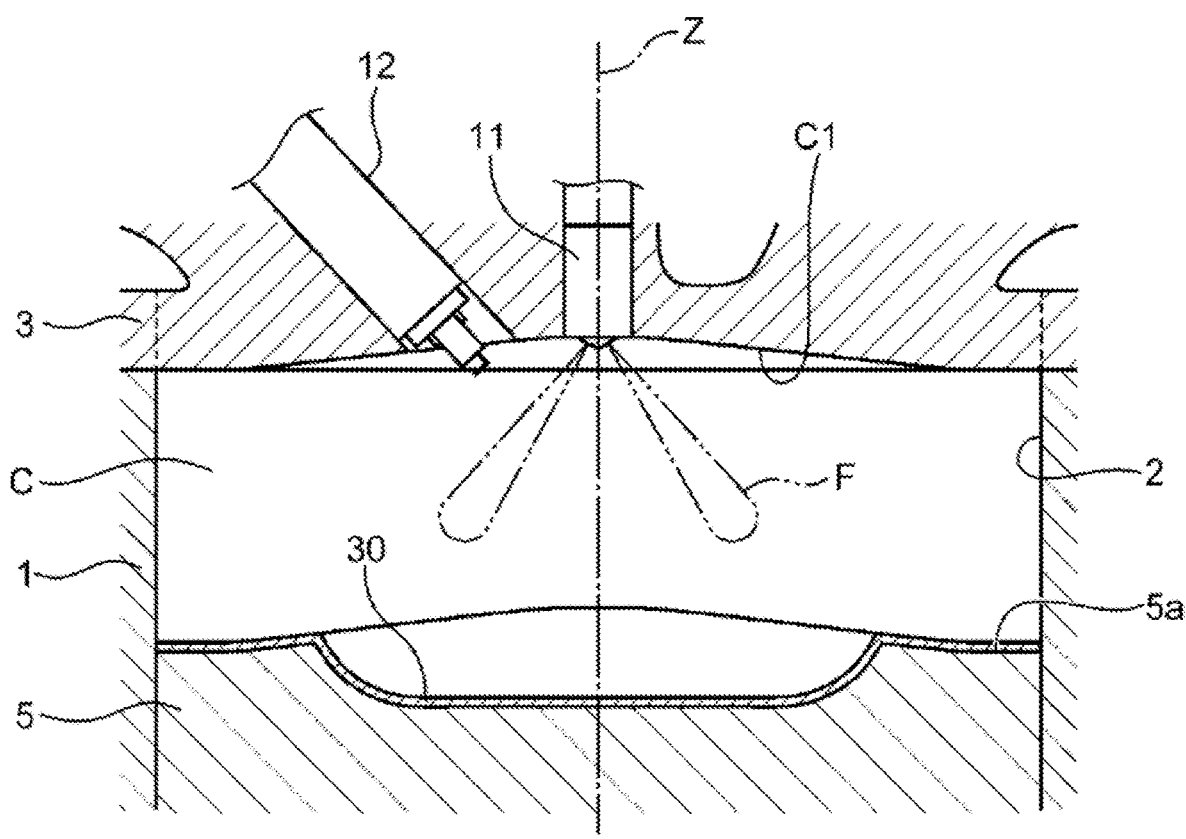
FIG. 2 is a cross-sectional view of substantial parts of the internal combustion engine.

FIG. 1 is a system diagram illustrating an outline configuration of an internal combustion engine manufactured by a manufacturing method according to one embodiment of the present disclosure, and FIG. 2 is a cross-sectional view of substantial parts of the internal combustion engine. The internal combustion engine (hereinafter, simply referred to as "the engine") illustrated in the figures is a four-cycle gasoline engine which includes a cylinder block 1, a cylinder head 3, and a piston 5. The cylinder block 1 and the cylinder head 3 are members which form a cylindrical cylinder 2 therein, and correspond to a "cylinder forming member" in the present disclosure. That is, the cylinder block 1 has a wall surface (cylinder liner) defining a circumferential surface of the cylinder 2, and the cylinder head 3 is attached to an upper surface of the cylinder block 1 so as to close the cylinder 2 from above. The piston 5 is a cylindrical member having an outer circumferential surface which is slidable on an inner circumferential surface (cylinder liner) of the cylinder block 1, and is reciprocatably accommodated inside the cylinder 2. Note that the engine of this embodiment is a vehicle-mounted engine which is mounted on a vehicle, such as the automobile, as a power source, and is typically of a multiple-cylinder type having a plurality of cylinders 2. However, for simplification, the engine is described herein focusing on only one of the cylinders 2.

Below the piston 5, a crankshaft 7 which is an output shaft of the engine is provided, and the crankshaft 7 is coupled to the piston 5 through a connecting rod 9.

A combustion chamber C is formed above the piston 5. That is, the combustion chamber C is a space defined by a wall surface defining the circumferential surface of the cylinder 2 (the inner circumferential surface of the cylinder block 1), a wall surface defining an upper surface of the cylinder 2 (a lower surface of the cylinder head 3), and a crown surface 5a (an upper surface) of the piston 5.

An injector 11 and an ignition plug 12 are disposed in the cylinder head 3. The injector 11 is an injection valve which injects fuel (fuel mainly containing gasoline) into the combustion chamber C. The ignition plug 12 is a plug which ignites a mixture gas inside the combustion chamber C, i.e., a mixture gas comprised of mixture of fuel injected from the injector 11 with air inside the combustion chamber C.

When the mixture gas combusts by ignition of the ignition plug 12, the piston 5 reciprocates in the up-and-down direction by receiving an expansion force caused by the combustion. This reciprocating motion of the piston 5 is transmitted to the crankshaft 7 through the connecting rod 9, thereby rotating the crankshaft 7.

The injector 11 is disposed along a center axis Z of the cylinder 2 so that a tip-end part thereof is located at the center of a ceiling surface Cl of the combustion chamber C (particularly, see FIG. 2). The injector 11 has a plurality of nozzle holes in the tip-end part, and injects fuel radially toward the crown surface 5a of the piston 5 from the nozzle holes. Note that the reference character "F" in FIG. 2 represents a spray of fuel injected from the injector 11.

The ignition plug 12 is attached adjacent to the injector 11 in a posture where it is inclined to the center axis Z of the cylinder 2 so that a tip-end part thereof is located near the center of the ceiling surface Cl of the combustion chamber C. Note that an electrode for discharging a spark to the combustion chamber C is provided to the tip-end part of the ignition plug 12.

As illustrated in FIG. 1, an intake port 13 and an exhaust port 14 which communicate with the combustion chamber C are formed in the cylinder head 3. The intake port 13 is a port for introducing intake air into the combustion chamber C, and the exhaust port 14 is a port for drawing exhaust gas out of the combustion chamber C. An intake valve 15 which opens and closes an opening of the intake port 13 on the combustion chamber C side and an exhaust valve 16 which opens and closes an opening of the exhaust port 14 on the combustion chamber C side are attached to the cylinder head 3.

An intake passage 20 and an exhaust passage 21 are connected to the cylinder head 3. The intake passage 20 is a passage where intake air introduced into the combustion chamber C circulates, and is connected to one of side surfaces of the cylinder head 3 so as to communicate with the intake port 13. The exhaust passage 21 is a passage where exhaust gas drawn out of the combustion chamber C circulates, and is connected to the other side surface of the cylinder head 3 so as to communicate with the exhaust port 14.

Structure of Piston Crown Surface

As illustrated in FIG. 2, a heat insulating layer 30 is formed in the crown surface 5a of the piston 5 (hereinafter, simply referred to as "the piston crown surface 5a"). The heat insulating layer 30 is made of resin of which the heat conductivity is lower than the piston 5. That is, while the piston 5 is made of metal, such as an aluminum alloy, the heat insulating layer 30 is made of resin of which the heat conductivity is greatly lower than the metal (base material) which constitutes the piston 5.

In detail, the heat insulating layer 30 in this embodiment is made of heat-resistant silicon-based resin. The silicon-based resin includes those comprised of three-dimensional polymer with a high branching degree which is represented by methyl silicone resin and methyl phenyl silicone resin. Note that the heat insulating layer 30 may contain hollow particles, such as Shirasu balloon. As will be described later in detail, the heat insulating layer 30 is fixedly adhered to the piston crown surface 5a by baking resin (a coating material 30A which will be described later) of paste form applied to the piston crown surface 5a.

The formation of the heat insulating layer 30 having the characteristics described above on the piston crown surface 5a leads to a reduction of cooling loss, and, as a result, leads to an improvement in fuel efficiency of the engine. That is, since the heat insulating layer 30 suppresses that combustion energy of the mixture gas which combusted inside the combustion chamber C is emitted outside through the piston crown surface 5a, a loss caused by the emission of the heat energy (i.e., cooling loss) can be reduced. This is expected to improve thermal efficiency which is a rate of heat energy converted into work (i.e., fuel efficiency of the engine).

Method of Manufacturing Engine

Figure 3:
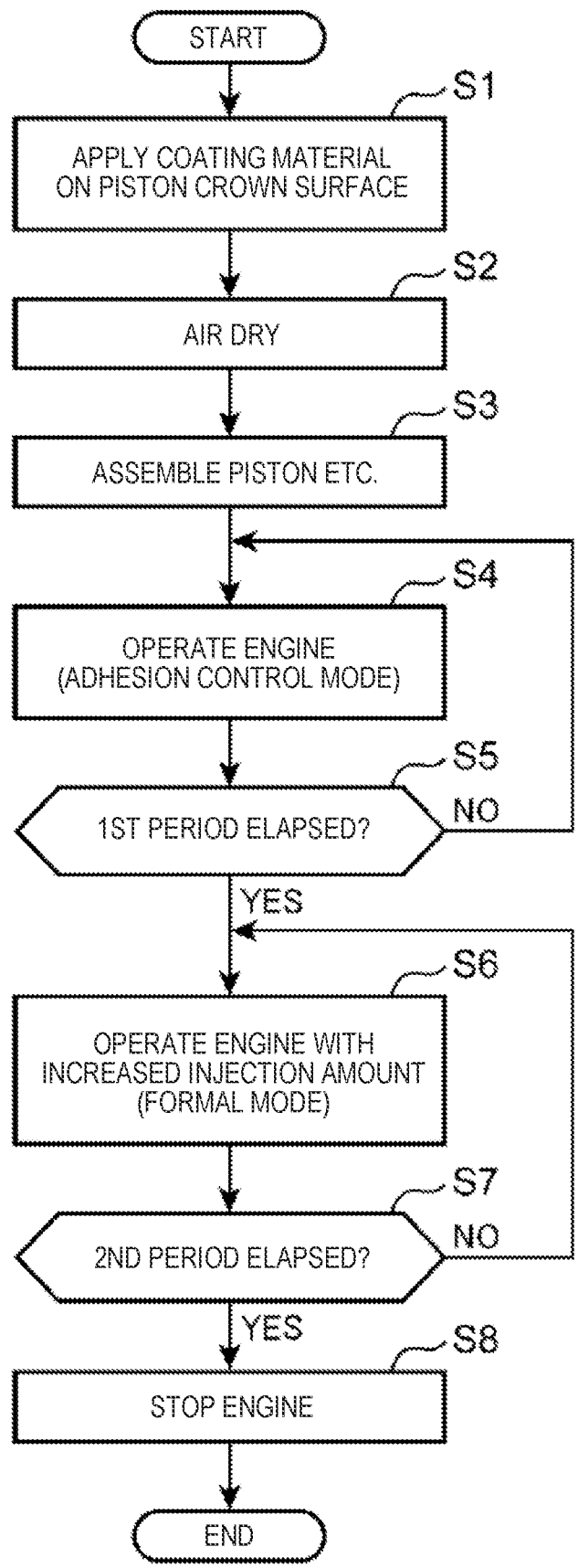
FIG. 3 is a flowchart illustrating a concrete procedure of the method of manufacturing the internal combustion engine.

Next, a method of manufacturing the engine of this embodiment having the above configuration is described. FIG. 3 is a flowchart illustrating a concrete procedure of the method of manufacturing the engine of this embodiment. Note that the manufacturing method illustrated in this flowchart is mainly related to the formation of the heat insulating layer 30. Therefore, substantial parts (the cylinder block 1, the cylinder head 3, the piston 5, etc.) which constitute the engine are already prepared as a prerequisite for implementing this method.

Figure 4:
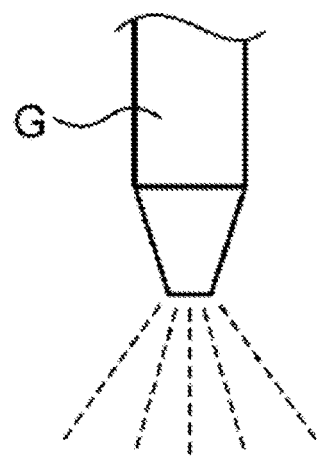
FIG. 4 is a view illustrating a situation of applying a coating material to a piston crown surface.
Figure 4:
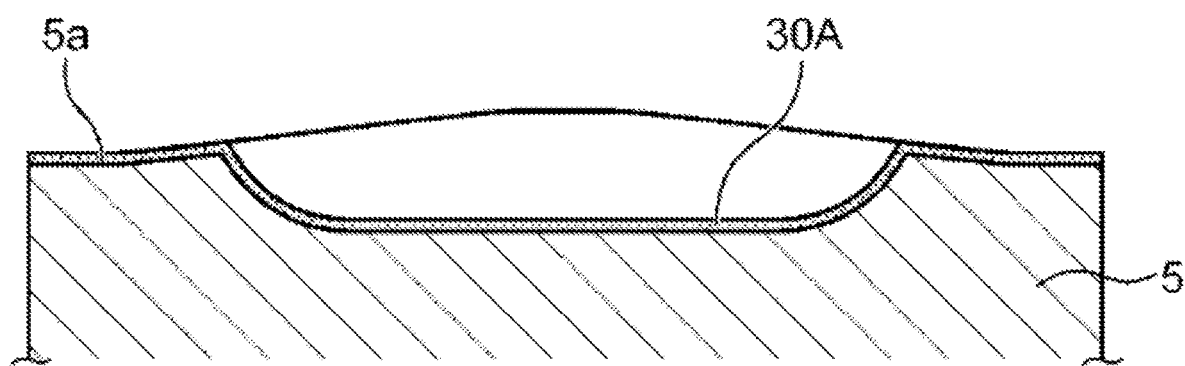

As the method of FIG. 3 is started, the coating material 30A illustrated in FIG. 4 is first applied to the piston crown surface 5a (Step S1). The coating material 30A is the material of the heat insulating layer 30 described above, and is made by diluting the paste-form resin by a diluent. In this embodiment, as the coating material 30A, a material which is made by diluting the paste-form silicon-based resin (methyl silicone resin, methyl phenyl silicone resin, etc.) with toluene to reduce the viscosity, is used. Note that if forming the heat insulating layer 30 containing the hollow particles (Shirasu balloon, etc.), the hollow particles are included in the coating material 30A. Moreover, the coating material 30A may contain a small amount of a catalyst, such as platinum ionic solution, as a curing catalyst which stimulates the curing of the coating material 30A.

As illustrated in FIG. 4, a spray gun G is used for the application of the coating material 30A to the piston crown surface 5a. That is, the coating material 30A is injected in a spray form from the spray gun G to be uniformly sprayed onto the piston crown surface 5a. This forms a layer of the coating material 30A having a substantially constant thickness on the piston crown surface 5a. Note that when applying the coating material 30A, it is desirable to process (e.g., degrease or sandblast) the piston crown surface 5a in advance.

Next, the coating material 30A applied to the piston crown surface 5a is air dried (Step S2). Note that the drying here is a process for avoiding a situation where the coating material 30A easily adheres to members other than the piston 5 (the cylinder block 1, the cylinder head 3, etc.) during the assembly of the engine (described later) and, thus, the surface of the coating material 30A is desirably to have at least some level of viscosity. Therefore, the drying process at Step S2 may be, for example, processing of allowing the piston 5 after the application of the coating material 30A to dry for a given period of time at the ambient temperature.

Next, an assembly is built by combining the substantial parts, such as the cylinder block 1, the cylinder head 3, and the piston 5 (Step S3). This assembly is a combination of the substantial parts so that combustion of mixture gas inside the combustion chamber C becomes possible (hereinafter, it is referred to as "the pre-completed engine"), where components, such as the injector 11, the ignition plug 12, the intake valve 15, and the exhaust valve 16, are assembled in addition to the cylinder block 1, the cylinder head 3, and the piston 5 which are described above. Note that the diluent contained in the coating material 30A has not yet been completely vaporized only by the air drying at the previous Step S2. Therefore, the coating material 30A is in an uncured (unhardened) state when the pre-completed engine is assembled at Step S3.

Next, the pre-completed engine is actually operated (Step S4). That is, fuel is injected from the injector 11 into the combustion chamber C to form the mixture gas, and the mixture gas is ignited using the ignition plug 12, thereby combusting the mixture gas and reciprocating the piston 5. Then, this reciprocating motion of the piston 5 by such combustion (operation of the pre-completed engine) is continued for a first period set in advance (a period T1 of FIG. 5 which will be described later). Note that operation of the pre-completed engine here is an operation in a special mode for suppressing fuel from adhering to the coating material 30A coating the piston crown surface 5a. Below, this mode for operating the pre-completed engine at Step S4 is referred to as "the adhesion control mode." Moreover, a mode in which the pre-completed engine is operated at Step S6 (described later) is referred to as a "formal mode." The operations in the adhesion control mode and the formal mode also serve as a test operation (combustion test) for confirming that the engine operates without problems.

Figure 5:
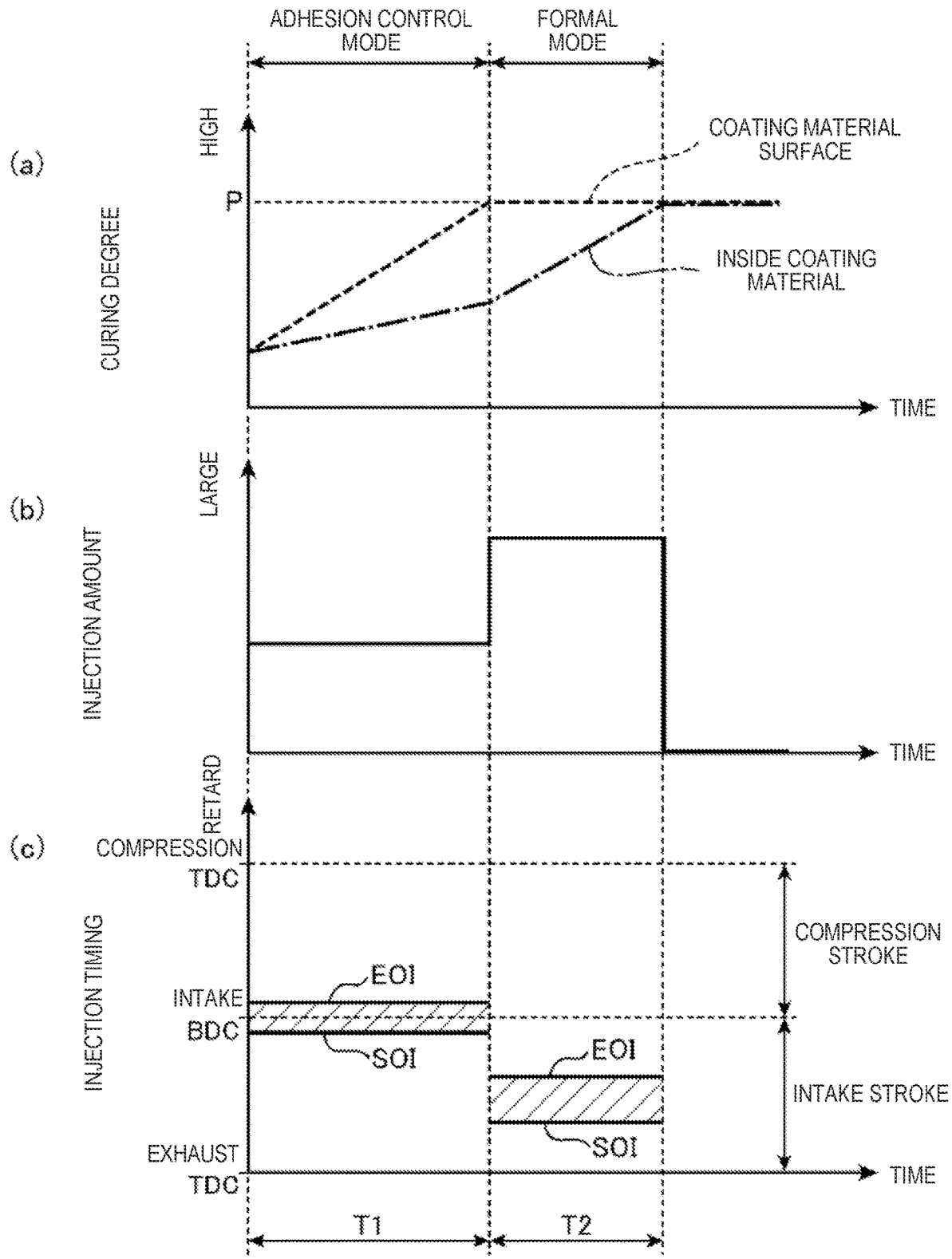
FIG. 5 is a time chart illustrating temporal changes in various parameters during operation for baking the coating material.

FIG. 5 is a time chart illustrating details of the operations at Step S4 (adhesion control mode) and Step S6 (formal mode). In detail, in FIG. 5, chart (a) illustrates a degree of curing of the coating material 30A, chart (b) illustrates a fuel injection amount, and chart (c) illustrates a fuel injection timing. Moreover, the origin in the horizontal axis in each chart is a start point of the operation in the adhesion control mode at Step S4, and a period T1 thereafter is an operating period in the adhesion control mode (i.e., the first period). Moreover, a period T2 following the first period T1 is an operating period in the formal mode (i.e., the second period).

As illustrated by waveforms of charts (b) and (c) during the first period T1, in the adhesion control mode (Step S4), the injection amount of fuel injected from the injector 11 is reduced below that in the subsequent formal mode (Step S6), and the injection timing of the fuel injected from the injector 11 is set near an intake bottom dead center (intake BDC).

In more detail, in the adhesion control mode, the injection amount of fuel is set at substantially half of the formal mode. Moreover, the injection timing of the fuel is set at a timing (period) so that the fuel is injected over a continuous period including the intake bottom dead center. That is, the fuel injection by the injector 11 is started at a timing near an intake bottom dead center on the advance side and is ended at a timing near the intake bottom dead center on the retard side. In other words, the timing of the fuel injection by the injector 11 is set so that the injection start timing (SOI) becomes in a final stage of an intake stroke and the injection end timing (EOI) becomes in an early stage of a compression stroke. Note that as is well known, the intake stroke is a period from an exhaust top dead center (exhaust TDC) to an intake bottom dead center (intake BDC), and the compression stroke is a period from an intake bottom dead center (intake BDC) to a compression top dead center (compression TDC). Thus, injecting a comparatively small amount of fuel near an intake bottom dead center at which the piston 5 separates the most from the injector 11 leads to greatly reducing the possibility that the fuel reaches (adheres to) the coating material 30A on the piston crown surface 5a while in a droplet state.

After the operation in the adhesion control mode is started as described above, the operation in the adhesion control mode is continued until an elapsed time from the operation start reaches the first period T1 (Step S5). That is, the elapsed time is counted from the operation start by using a timer, it is determined whether the counted value reaches the first period T1, and the operation is continued in the adhesion control mode until the elapsed time reaches the first period T1.

As illustrated in chart (a) of FIG. 5, the first period T1 which is the operating period in the adhesion control mode is set as a period required for almost completely curing (hardening) the surface of the coating material 30A. That is, although the coating material 30A is heated and gradually hardened by the combustion heat of the mixture gas, since the surface of the coating material 30A directly exposed to the combustion gas becomes higher in the temperature than the inside of the coating material 30A not directly exposed to the combustion gas, the surface of the coating material 30A becomes faster in the curing rate. That is why, during the first period Ti of chart (a), a broken-line waveform representing the degree of curing of the surface of the coating material 30A has a steeper slope than a one-dot-chain-line waveform representing the degree of curing of the inside the coating material 30A. That is, if a target degree of curing of the coating material 30A is P, the surface of the coating material 30A reaches the target value P of the degree of curing (i.e., the cure is finished) earlier than the inside of the coating material 30A. Based on this fact, the first period T1 which is the operating period in the adhesion control mode is set as a period during which the surface of the coating material 30A is almost completely cured at the end of this period (the degree of curing substantially reaches the target value P). Therefore, when the first period T1 is elapsed (i.e., when the operation in the adhesion control mode is finished), the surface of the coating material 30A is almost completely cured, but the curing of the inside of the coating material 30A is still insufficient. Note that the first period T1 for acquiring such a state of the coating material 30A may be obtained experimentally in advance.

When the lapse of the first period T1 is confirmed at Step S5, the operation mode is changed from the adhesion control mode to the formal mode (Step S6), and the operation in the formal mode is continued for the second period T2 which continues from the first period T1 (Step S7). The formal mode is a mode in which the pre-completed engine is operated in a state where the injection amount of fuel is increased and the injection timing is advanced, as compared to those in the adhesion control mode.

In detail, as illustrated in FIG. 5, during the operation in the formal mode, the injection amount of fuel is doubled from the adhesion control mode. Moreover, the injection timing of the fuel is set at a timing (period) when the fuel is injected over a continuous period included in an intake stroke. In other words, the fuel injection by the injector 11 is controlled so that both the injection start timing (SOI) and the injection end timing (EOI) are on the retard side of an exhaust top dead center (exhaust TDC) and on the advance side of the intake bottom dead center (intake BDC). The period from the injection start to the injection end is made longer than that in the adhesion control mode, corresponding to the increase in the injection amount described above.

As described above, injecting a relatively large amount of fuel in an intake stroke increases an amount of heat release by combustion, and it leads to stimulating the curing (baking) of the coating material 30A on the piston crown surface 5a. That is, in the formal mode with a large amount of heat release, since the temperature inside the coating material 30A becomes higher than that in the adhesion control mode described above, the curing rate inside the coating material 30A increases. That is why, in chart (a) of FIG. 5, the curing rate inside the coating material 30A during the second period T2 (formal mode) is faster than the curing rate during the first period Ti (adhesion control mode). Note that since the curing of the surface of the coating material 30A has already been finished at the end of the adhesion control mode (at the start of the formal mode), the degree of curing hardly changes even when the mode is shifted to the formal mode.

As illustrated in chart (a), the second period T2 which is the operating period in the formal mode is set as a period during which the curing of the inside of the coating material 30A is almost finished. That is, by continuing the operation in the formal mode for the second period T2, the degree of curing of the inside of the coating material 30A increases substantially to the target value P. Thus, not only the surface of the coating material 30A but the inside of the coating material 30A is fully hardened, thereby completing the baking of the coating material 30A (the formation of the heat insulating layer 30). In other words, substantially all the diluent (toluene) is vaporized from the coating material 30A to solidify the coating material 30A, and this solidified coating material 30A is formed on the piston crown surface 5a as the heat insulating layer 30 (FIG. 2). Note that such a second period T2 for completing the curing of the inside of the coating material 30A may be obtained in advance experimentally.

When the formation of the heat insulating layer 30 is finished as described above, the fuel injection from the injector 11 is suspended to end the operation of the engine by the combustion of the mixture gas (Step S8). Then, components (accessories, etc.) which are not included in the pre-completed engine assembled at Step S3 are assembled to complete the manufacturing of the engine.

Note that in the method of manufacturing the engine described above, Step S1 is an example of an "application step" in the present disclosure, Step S3 is an example of an "assembly step" in the present disclosure, Step S4 is an example of a "first bake step" in the present disclosure, Step S5 is an example of a "determination step" in the present disclosure, and Step S6 is an example of a "second bake step" in the present disclosure.

Operation and Effects

As described above, in this embodiment, the heat insulating layer 30 is formed on the piston crown surface 5a by a method including a step in which the paste-form coating material 30A is applied to the piston crown surface 5a (S1), a step in which the substantial parts including the piston 5 after the application are assembled to build the pre-completed engine (S3), and a step in which the pre-completed engine is operated in two kinds of modes with different injection amounts and injection timings (S4 and S6). According to such a configuration, there are advantages that the sufficient quality of the heat insulating layer 30 is secured and the formation of the heat insulating layer 30 becomes easier.

That is, in this embodiment, the coating material 30A applied to the piston crown surface 5a is baked (cured) using the combustion heat during the operation carried out after the assembly of the substantial parts including the piston 5. Thus, for example, by performing the operation for baking as the test operation (combustion test) normally performed in the manufacturing process of the engine, the burden and the cost required for baking the coating material 30A (i.e., forming the heat insulating layer 30) can be reduced. For example, if the coating material 30A applied to the piston crown surface 5a is baked with heat using a heating furnace, the burden in baking and the burden of the test operation are separately required. Further, an equipment such as the heating furnace must be additionally provided. On the other hand, if the coating material 30A is baked by the combustion heat of the mixture gas like this embodiment, the equipment for the baking does not need to be newly provided, and a part of the process for forming the heat insulating layer 30 can be substituted by the test operation of the engine. Therefore, it becomes possible to manufacture the engine having the heat insulating layer 30, which is excellent in thermal efficiency, at low cost and in a short period of time.

Moreover, as the operation for baking the coating material 30A, the operation in the adhesion control mode (S4) and the operation in the formal mode (S6) are carried out in this order. Further, during the operation in the adhesion control mode which is selected first, the injection amount of fuel from the injector 11 is reduced and the injection timing of fuel is set near an intake bottom dead center. Therefore, the possibility of the fuel adhering to the coating material 30A applied to the piston crown surface 5a while in the droplet state can greatly be reduced.

That is, the possibility of the injected fuel from the injector 11 reaching the coating material 30A while in the droplet state becomes lower as a distance from the injector 11 to the piston 5 increases, and becomes lower as the injection amount of fuel decreases. This is because the vaporization of the fuel fully progresses before the fuel reaches the piston crown surface 5a. In this embodiment, in the adhesion control mode, the injection amount is reduced below the amount in the subsequent formal mode, and the fuel is injected over the continuous period including an intake bottom dead center during which the distance from the injector 11 to the piston 5 is the largest. Therefore, the possibility of the injected fuel reaching (adhering to) the coating material 30A on the piston crown surface 5a while in the droplet state can greatly be reduced. This means that the possibility of the uncured coating material 30A is diluted with the adhered fuel (particularly, toluene contained in the fuel) is greatly reduced. Therefore, even if a large pressure by the combustion of the mixture gas (combustion pressure) acts on the coating material 30A, a deformation occurring in the coating material 30A can be minimized, and therefore, the quality of the heat insulating layer 30 comprised of the cured coating material 30A can be appropriately secured. For example, if the coating material 30A is diluted by adhesion of the fuel, the viscosity of the coating material 30A decreases in the diluted part (fuel adhered part). Therefore, the coating material 30A may be dispersed when high combustion pressure acts thereon. On the other hand, in this embodiment, since the possibility of the adhesion of fuel by the adjustment of the injection amount and the injection timing (adhesion control mode) is greatly reduced, the dispersion of the coating material 30A cause by the above situation can be avoided with a high probability. As a result, the possibility that a defect, such as peeling, occurs in the heat insulating layer 30 can greatly be reduced, thereby securing the appropriate quality of the heat insulating layer 30.

On the contrary, since the injection amount of fuel is increased in the formal mode following the adhesion control mode, the curing (baking) of the inside of the coating material 30A can be stimulated, while securing the above effect of suppressing the defect, such as peeling, thereby reducing the burden required for forming the heat insulating layer 30. That is, the curing of the coating material 30A progresses quicker on the surface than the inside. On the other hand, if the surface of the coating material 30A is fully hardened (even if the inside has not been hardened), the dilution of the coating material 30A by the adhesion of fuel will not take place. Therefore, the situation where a part of the coating material 30A is dispersed by the combustion pressure is avoidable. In this embodiment, the injection amount is increased in response to the transition from the adhesion control mode to the formal mode. Therefore, by shifting to the formal mode at the timing when the surface of the coating material 30A is fully hardened, the increase in the injection amount can improve the combustion heat (heat capacity), while avoiding the above situation where a part of the coating material 30A is dispersed, thereby increasing the curing rate inside the uncured coating material 30A. Thus, the time required for curing the entire coating material 30A can be shortened, and the efficiency of the formation of the heat insulating layer 30 can be increased, while securing the quality of the heat insulating layer 30.

Moreover, in the formal mode in which the fuel amount is increased, since the injection timing of the fuel is advanced more than that in the adhesion control mode (both the injection start timing and the injection end timing are set in an intake stroke), the increased fuel can be fully mixed with air to form a uniform mixture gas inside the combustion chamber C, and the sufficient combustion stability can be secured, while generating the high combustion heat for accelerating the curing.

Modifications

Although in the above embodiment, the operation is changed into the formal mode after continuing the operation in the adhesion control mode for the first period T1 which is predetermined, the method of determining the timing of the mode change is not limited to this configuration. For example, if a sensor detects the content of toluene (diluent) contained in exhaust gas discharged during the operation for baking the coating material 30A (test operation), a degree of progress in the curing (baking) of the coating material 30A may be determined. Thus, the content of toluene in exhaust gas may be monitored using the sensor, and when the content falls to a given threshold (a value at which the surface of the coating material 30A can be regarded as having been fully hardened), the operation mode may be shifted from the adhesion control mode to the formal mode. Therefore, the timing suitable for the transition to the formal mode (i.e., the timing at which the surface of the coating material 30A is fully hardened) may be determined with sufficient accuracy. Note that the period required for fully hardening the surface of the coating material 30A may be obtained experimentally with certain accuracy. In the above embodiment, using this feature, the adhesion control mode and the formal mode are simply divided by time. Therefore, it becomes possible to appropriately perform the baking work of the coating material 30A utilizing the combustion heat, without additionally providing the special equipment (sensor etc.).

Although in the above embodiment, while injecting the fuel over the continuous period including an intake bottom dead center in the adhesion control mode, the injection timing is advanced until both the injection start timing (SOI) and the injection end timing (EOI) of the fuel are included in an intake stroke in the formal mode, at least an injection center of gravity position of the fuel (a position at which the injection timing from SOI to EOI is bisected) may be advanced in the formal mode, and the advancing of both SOI and EOI is not essential. For example, since the injection amount increases in the formal mode, the injection period from SOI to EOI becomes longer. Thus, the injection center of gravity position may be advanced by advancing SOI while EOI is fixed.

Although in the above embodiment, both the injection amount and the injection timing of the fuel are adjusted so that the adhesion of fuel becomes more difficult to occur in the adhesion control mode (i.e., reducing the injection amount and bringing the injection timing closer to a bottom dead center), only one of the injection amount and the injection timing may be adjusted so that the adhesion of the fuel becomes more difficult to occur. Moreover, it is possible to adjust the injection pressure of the fuel, additionally or alternatively to the injection amount and the injection timing. For example, if the injection pressure is reduced, the penetration of fuel may become weaker, and the possibility of the fuel reaching the coating material 30A may be reduced. Thus, the injection pressure of the fuel may be reduced in the adhesion control mode, as compared with that in the formal mode.

Although in the above embodiment, the heat insulating layer 30 is formed only on the piston crown surface 5a defining the bottom surface of the combustion chamber C, a similar heat insulating layer may also be applied to the wall surfaces of the combustion chamber C other than the piston crown surface 5a. For example, the heat insulating layer may also be formed on the ceiling surface C1 of the combustion chamber C (a lower surface of the cylinder head 3), lower surfaces of umbrella parts of the intake and exhaust valves, and the circumferential surface (cylinder liner) of the cylinder 2. The heat insulating layers formed on any of the surfaces may be formed by the method of baking the paste-form coating material which is the material of the heat insulating layer by the combustion heat of the mixture gas, similar to the heat insulating layer 30 of the above embodiment.

Figure 6:
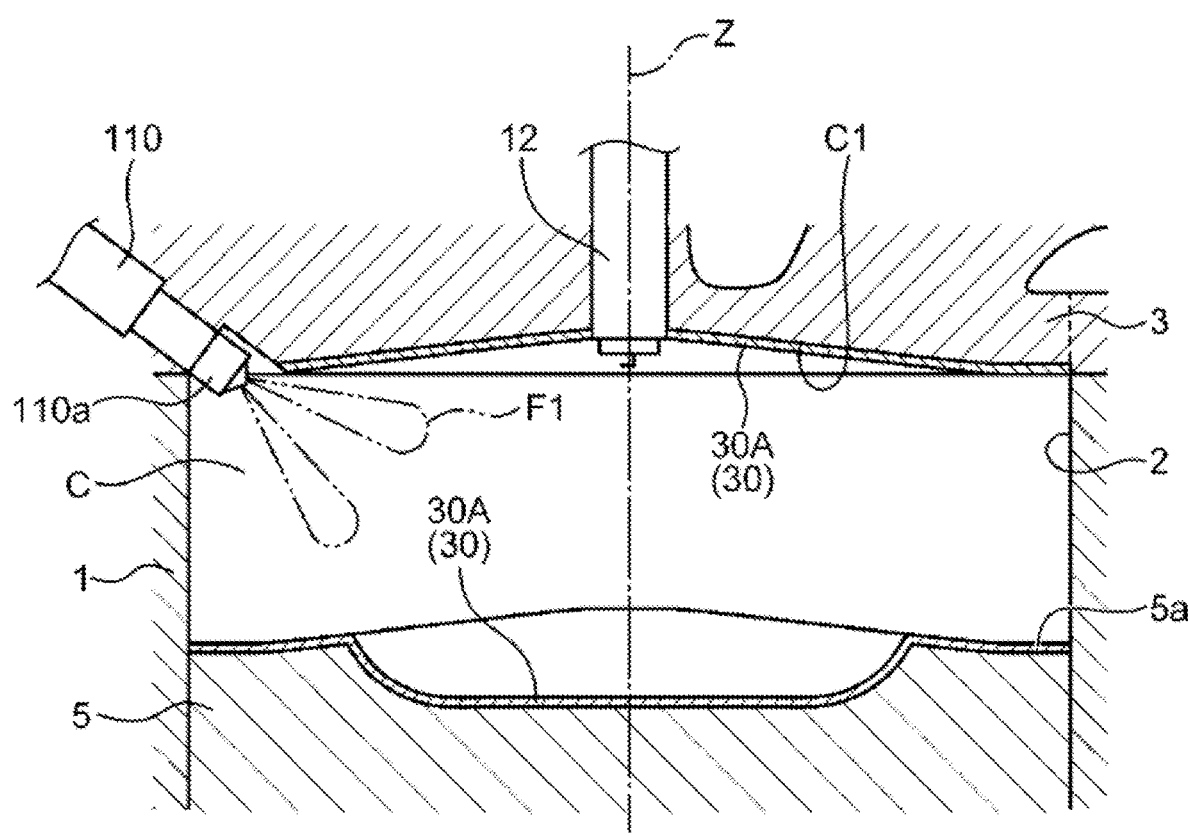
FIG. 6 is a view corresponding to FIG. 2, illustrating a modification of the above embodiment.

FIG. 6 is a view corresponding to FIG. 2, illustrating one example in which the coating material 30A is applied to the ceiling surface C1 of the combustion chamber C (hereinafter, simply referred to as "the combustion-chamber ceiling surface C1") in addition to the piston crown surface 5a, and the coating material 30A is baked with combustion heat. That is, in the example of FIG. 6, both the coating material 30A applied to the piston crown surface 5a and the coating material 30A applied to the ceiling surface C1 are baked by the combustion heat of the fuel injected from an injector 110 and becomes the heat insulating layer 30.

Moreover, in the example of FIG. 6, unlike the above embodiment (where the injector 11 is disposed at the center of the combustion-chamber ceiling surface C1), the injector 110 is disposed so as to face the combustion chamber C from the sideway on the intake side. That is, the injector 110 is attached to the cylinder head 3 so that a tip-end part 110a thereof is located at a circumferential edge part of the combustion-chamber ceiling surface C1 and becomes in a largely inclined posture so that it faces the center axis Z of the cylinder 2 from the circumferential edge part. In this case, in order to suppress the adhesion of the fuel to the coating material 30A on the piston crown surface 5a and the coating material 30A on the combustion-chamber ceiling surface C1, it is also desirable to reduce the injection amount of fuel from the injector 110 and set the injection timing of the fuel from the injector 110 at the timing as close to an intake bottom dead center as possible. Thus, when the fuel is injected at the timing where the piston 5 becomes close to the bottom dead center, a spray F1 of the fuel obliquely injected from the injector 110 becomes easier to change the course to downward, thereby avoiding that the fuel spray F1 changes the course to upward, toward the combustion-chamber ceiling surface C1. This reduces the possibility that the fuel adheres to the coating material 30A on the piston crown surface 5a and the combustion-chamber ceiling surface C1, with the help of the distance from the injector 110 to the piston 5 being large.

Although description is omitted in the above embodiment, the vaporizability (the easiness of evaporation) of the fuel varies according to the temperature condition of the combustion chamber C. For example, the fuel becomes easier to evaporate as the temperature of the combustion chamber C immediately before the fuel injection increases. Moreover, the easier evaporation of the fuel reduces the possibility that the fuel adheres to the coating material 30A. Thus, the injection amount of fuel injected during the operation in the adhesion control mode may be increased, for example, as an intake air temperature (or the ambient temperature) increases, or as an engine water temperature increases.

Although in the above embodiment, the present disclosure is applied to the direct-injection gasoline engine which is provided with the injector 11 which directly injects the fuel into the combustion chamber C and uses gasoline as the fuel, engines to which the present disclosure is applicable are not limited to the engine described above. For example, the present disclosure is also applicable to port-injection gasoline engines and diesel engines.

In the case of the port-injection gasoline engine (i.e., the engine which injects gasoline fuel into the intake port), by reducing the injection amount of fuel in the adhesion control mode, the possibility that the fuel adheres to the coating material applied to the combustion-chamber wall surface, such as the piston crown surface, can be reduced. Further, the possibility that the fuel evaporates while the mixture gas flows from the intake port to the piston crown surface increases when the fuel is injected into the intake port at a timing where the piston is near a bottom dead center. Therefore, for example, setting the injection timing of the fuel at a later timing, such as in the second half of an intake stroke, may also lead to the suppression of the fuel adhering to the coating material.

In the case of the diesel engine (i.e., the engine which combusts diesel fuel by compression ignition), by reducing the injection amount of fuel in the adhesion control mode, and combusting the fuel in a premixed mode in which at least a portion of the fuel is injected at a comparatively early timing in a compression stroke, the possibility that the fuel adheres to the coating material of the combustion-chamber wall surface can be reduced.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1: Cylinder Block (Cylinder Forming Member)
2: Cylinder
3: Cylinder Head (Cylinder Forming Member)
5: Piston
5a: (Piston) Crown Surface
11: Injector
30: Heat Insulating Layer
30A: Coating Material
C: Combustion Chamber

What is claimed is:

1. A method of manufacturing an internal combustion engine including a cylinder forming member forming a cylinder therein, a piston reciprocatably accommodated in the cylinder, an injector configured to supply fuel into a combustion chamber defined by the cylinder and the piston, and a heat insulating layer covering at least a part of a combustion-chamber wall surface defining the combustion chamber and having a lower heat conductivity than the combustion-chamber wall surface, the method comprising the steps of:

applying a coating material that is a material of the heat insulating layer to the combustion-chamber wall surface;

assembling the piston to the cylinder forming member while the coating material is uncured; and heating the coating material to be cured by combusting the fuel injected from the injector and reciprocating the piston, wherein the heating the coating material includes injecting the fuel from the injector at least in an early stage of the heating so that the injected fuel adhering to a surface of the coating material is suppressed, wherein the applying the coating material includes applying the coating material at least to a crown surface of the piston, and wherein the injecting the fuel from the injector at least in the early stage includes setting an injection timing of the fuel from the injector as a period including an intake bottom dead center.

2. The method of claim 1, wherein the heating the coating material further includes advancing an injection start timing and an injection end timing of the fuel from the injector after the injecting the fuel from the injector at least in the early stage is performed.

3. The method of claim 2,
wherein the injecting the fuel from the injector at least in the early stage includes reducing an injection amount of the fuel from the injector below that when advancing the injection start timing and the injection end timing.

4. The method of claim 3,
wherein the injecting the fuel from the injector at least in the early stage includes setting the injection timing of the fuel from the injector to a timing at which the piston is located closer to a bottom dead center than when advancing the injection start timing and the injection end timing.

5. The method of claim 4,
wherein the injecting the fuel from the injector at least in the early stage includes reducing an injection pressure of the fuel from the injector compared to when advancing the injection start timing and the injection end timing.

6. The method of claim 5, wherein the advancing the injection start timing and the injection end timing of the fuel is started when an elapsed time after the injecting the fuel from the injector at least in the early stage is started reaches a predetermined period of time.

7. The method of claim 6, further comprising determining a degree of curing of the surface of the coating material baked when injecting the fuel from the injector at least in the early stage,
wherein when the curing of the surface of the coating material is determined to be finished, the advancing the injection start timing and the injection end timing of the fuel is started.

8. An internal combustion engine manufactured by the method of claim 7.

9. The method of claim 1,
wherein the heating the coating material further includes advancing an injection start timing and an injection end timing of the fuel from the injector after the injecting the fuel from the injector at least in the early stage is performed, and
wherein the injecting the fuel from the injector at least in the early stage includes reducing an injection pressure of the fuel from the injector compared to when advancing the injection start timing and the injection end timing.

10. The method of claim 2, wherein the advancing the injection start timing and the injection end timing of the fuel is started when an elapsed time after the injecting the fuel from the injector at least in the early stage is started reaches a predetermined period of time.

11. The method of claim 2, further comprising determining a degree of curing of the surface of the coating material baked when injecting the fuel from the injector at least in the early stage,
wherein when the curing of the surface of the coating material is determined to be finished, the advancing the injection start timing and the injection end timing is started.

12. A method of manufacturing an internal combustion engine including a cylinder forming member forming a cylinder therein, a piston reciprocatably accommodated in the cylinder, an injector configured to supply fuel into a combustion chamber defined by the cylinder and the piston, and a heat insulating layer covering at least a part of a combustion-chamber wall surface defining the combustion chamber and having a lower heat conductivity than the combustion-chamber wall surface, the method comprising the steps of:
applying a coating material that is a material of the heat insulating layer to the combustion-chamber wall surface;
assembling the piston to the cylinder forming member while the coating material is uncured; and
heating the coating material to be cured by combusting the fuel injected from the injector and reciprocating the piston,
wherein the heating the coating material includes injecting the fuel from the injector at least in an early stage of the heating so that the injected fuel adhering to a surface of the coating material is suppressed,
wherein the heating the coating material further includes advancing an injection start timing and an injection end timing of the fuel from the injector after the injecting the fuel from the injector at least in the early stage is performed, and
wherein the injecting the fuel from the injector at least in the early stage includes reducing an injection amount of the fuel from the injector below that when advancing the injection start timing and the injection end timing.

13. The method of claim 12,
wherein the applying the coating material includes applying the coating material at least to a crown surface of the piston, and
wherein the injecting the fuel from the injector at least in the early stage includes setting an injection timing of the fuel from the injector to a timing at which the piston is located closer to a bottom dead center than when advancing the injection start timing and the injection end timing.

14. An internal combustion engine manufactured by the method of claim 12.

15. A method of manufacturing an internal combustion engine including a cylinder forming member forming a cylinder therein, a piston reciprocatably accommodated in the cylinder, an injector configured to supply fuel into a combustion chamber defined by the cylinder and the piston, and a heat insulating layer covering at least a part of a combustion-chamber wall surface defining the combustion chamber and having a lower heat conductivity than the combustion-chamber wall surface, the method comprising the steps of:
applying a coating material that is a material of the heat insulating layer to the combustion-chamber wall surface;
assembling the piston to the cylinder forming member while the coating material is uncured; and
heating the coating material to be cured by combusting the fuel injected from the injector and reciprocating the piston,
wherein the heating the coating material includes injecting the fuel from the injector at least in an early stage of the heating so that the injected fuel adhering to a surface of the coating material is suppressed,
wherein the heating the coating material further includes advancing an injection start timing and an injection end timing of the fuel from the injector after the injecting the fuel from the injector at least in the early stage is performed, and wherein the injecting the fuel from the injector at least in the early stage includes reducing an injection pressure of the fuel from the injector compared to when advancing the injection start timing and the injection end timing.

16. An internal combustion engine manufactured by the method of claim 15.

* * * * *